(12) United States Patent
Zhao et al.

(10) Patent No.: US 11,310,515 B2
(45) Date of Patent: Apr. 19, 2022

(54) METHODS AND APPARATUS FOR IMPROVEMENT FOR INTRA-INTER PREDICTION MODE

(71) Applicant: TENCENT AMERICA LLC, Palo Alto, CA (US)

(72) Inventors: Liang Zhao, San Diego, CA (US); Xin Zhao, Sunnyvale, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/673,097

(22) Filed: Nov. 4, 2019

(65) Prior Publication Data

US 2020/0154114 A1 May 14, 2020

Related U.S. Application Data

(60) Provisional application No. 62/788,056, filed on Jan. 3, 2019, provisional application No. 62/767,228, filed on Nov. 14, 2018.

(51) Int. Cl.
*H04N 19/159* (2014.01)
*H04N 19/103* (2014.01)
*H04N 19/176* (2014.01)
*H04N 19/117* (2014.01)

(52) U.S. Cl.
CPC ......... *H04N 19/176* (2014.11); *H04N 19/117* (2014.11); *H04N 19/159* (2014.11)

(58) Field of Classification Search
CPC ..... H04N 19/10; H04N 19/102; H04N 19/103
See application file for complete search history.

(56) References Cited

U.S. PATENT DOCUMENTS

| 9,609,343 | B1 | 3/2017 | Chen et al. | |
|---|---|---|---|---|
| 2006/0153297 | A1 | 7/2006 | Boyce | |
| 2014/0072041 | A1 | 3/2014 | Seregin et al. | |
| 2016/0227244 | A1* | 8/2016 | Rosewarne | H04N 19/463 |
| 2017/0280162 | A1 | 9/2017 | Zhao et al. | |
| 2018/0176587 | A1 | 6/2018 | Panusopone et al. | |
| 2018/0376149 | A1* | 12/2018 | Zhang | H04N 19/503 |
| 2020/0007870 | A1* | 1/2020 | Ramasubramonian | H04N 19/174 |

OTHER PUBLICATIONS

Written Opinion dated Feb. 21, 2020, issued by the International Searching Authority in application No. PCT/US2019/060845.
International Search Report dated Feb. 21, 2020, issued by the International Searching Authority in application No. PCT/US2019/060845.

* cited by examiner

*Primary Examiner* — Kyle M Lotfi
(74) *Attorney, Agent, or Firm* — Sughrue Mion, PLLC

(57) ABSTRACT

An improved scheme for intra-inter prediction mode and an adaptive intra-inter prediction mode for video coding/decoding, including selecting a set of weightings in an intra-inter mode and applying position dependent intra prediction combination to modify at least one of an inter prediction sample and a reconstructed sample of an inter coded coding unit.

20 Claims, 14 Drawing Sheets

FIG. 5
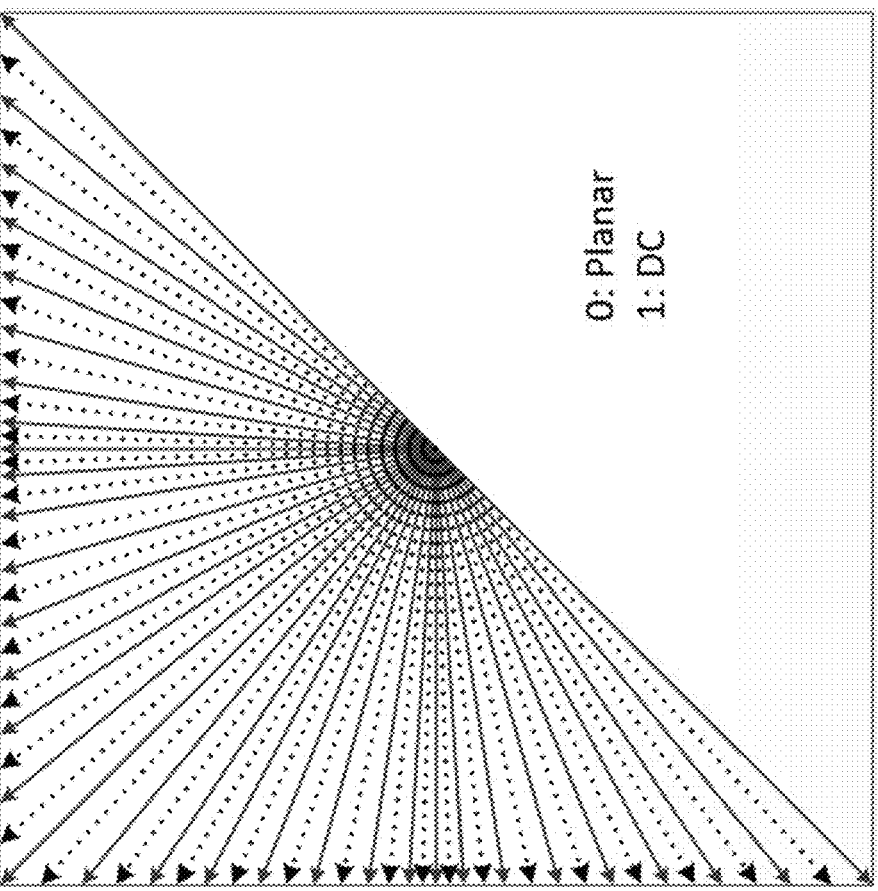
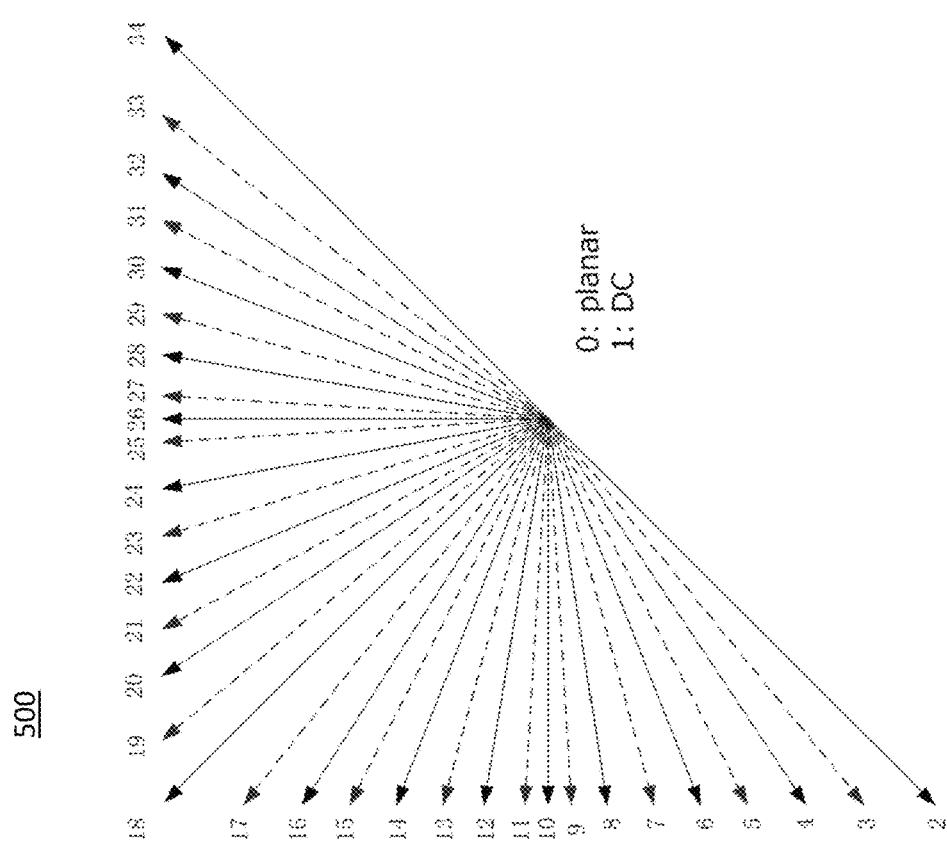

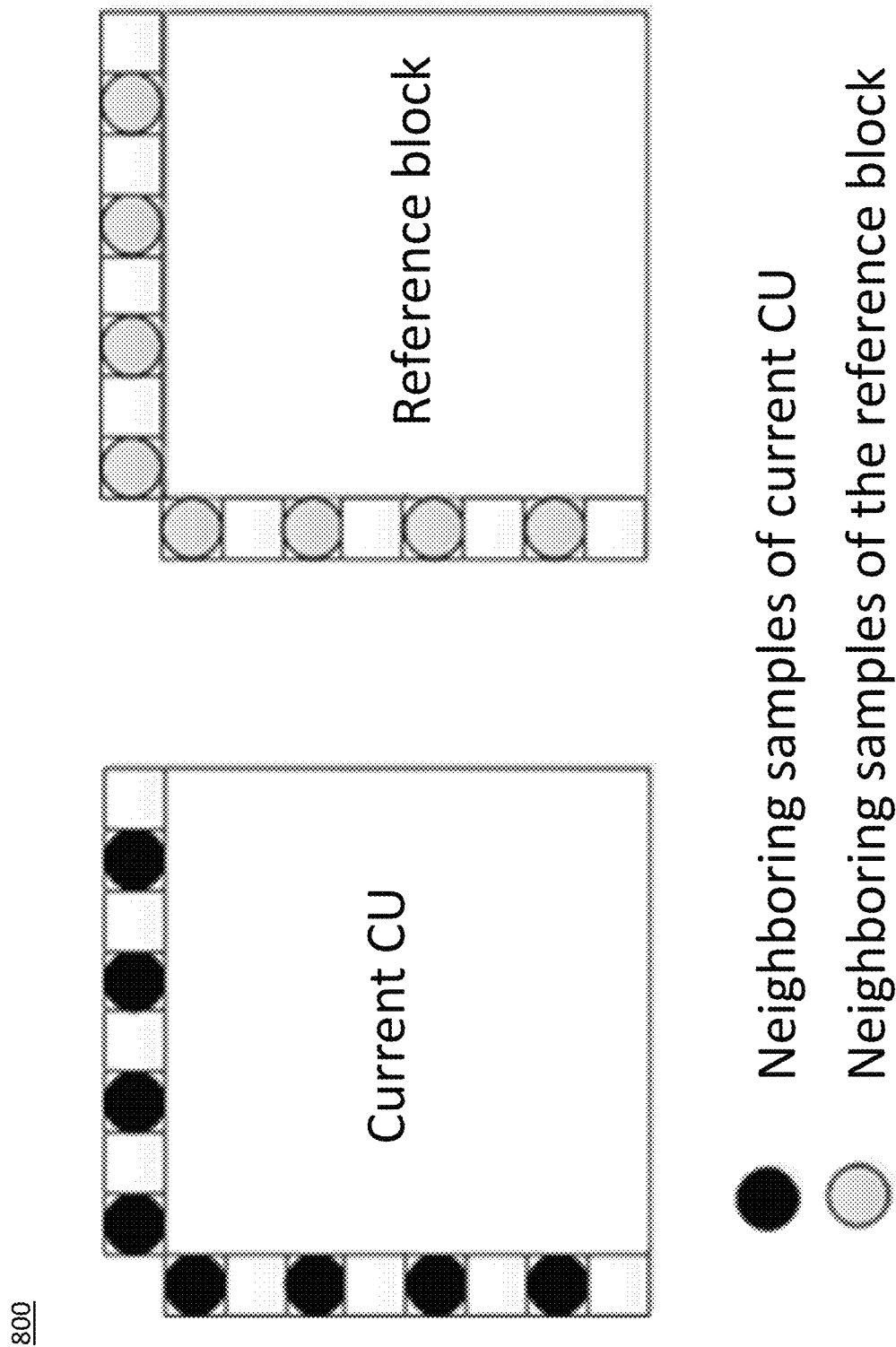

901

900

METHODS AND APPARATUS FOR IMPROVEMENT FOR INTRA-INTER PREDICTION MODE

CROSS REFERENCE TO RELATED APPLICATION

The present application claims priority to provisional applications U.S. 62/767,228 filed on Nov. 14, 2018 and U.S. 62/788,056 filed on Jan. 3, 2019. Each of the above applications is hereby expressly incorporated by reference, in its entirety, into the present application.

BACKGROUND

1. Field

The present disclosure is directed a set of advanced video coding technologies including an improved scheme for intra-inter prediction mode and an adaptive intra-inter prediction mode.

2. Description of Related Art

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

The following clause from VVC draft 2 describes PDPC, where nScale is used to specify the weighting factor decrement rate, and "32" in equation 8-77, 8-78, 8-82, and 8-83 specifies the initial weighting factors.

Inputs to a position-dependent intra prediction combination process may be
  the intra prediction mode predModeIntra,
  a variable nTbW specifying the transform block width,
  a variable nTbH specifying the transform block height,
  a variable refW specifying the reference samples width,
  a variable refH specifying the reference samples height,
  the predicted samples predSamples[x][y], with x=0 . . . nTbW−1 and y=0 . . . nTbH−1,
  the neighbouring samples p[x][y], with x=−1, y=−1 . . . refH−1 and x=0 . . . refW−1, y=−1,
  a variable cIdx specifying the colour component of the current block.

Outputs of this process are the modified predicted samples predSamples[x][y] with x=0 . . . nTbW−1, y=0 . . . nTbH−1.

Depending on the value of cIdx, the function clip1Cmp is set as follows:
  If cIdx is equal to 0, clip1Cmp is set equal to Clip1$_Y$.
  Otherwise, clip1Cmp is set equal to Clip1$_C$.

The variable nScale is set to $((\text{Log }2(nTbW) + \text{Log }2(nTbH) - 2) >> 2)$.

The reference sample arrays mainRef[x] and sideRef[y], with x=0 . . . refW and y=0 . . . refH are derived as follows:

$$\text{mainRef}[x] = p[x][-1]$$

$$\text{sideRef}[y] = p[-1][y]$$

The variables refL[x][y], refT[x][y], wT[y], wL[y] and wTL[x][y] with x=0 . . . nTbW−1, y=0 . . . nTbH−1 are derived as follows:

If predModeIntra is equal to INTRA_PLANAR, INTRA_DC, INTRA_ANGULAR18, or INTRA_ANGULAR50, the following applies:

$$\text{ref}L[x][y] = p[-1][y]$$

$$\text{ref}T[x][y] = p[x][-1]$$

$$wT[y] = 32 >> ((y<<1) >> n\text{Scale})$$

$$wL[x] = 32 >> ((x<<1) >> n\text{Scale})$$

$$wTL[x][y] = (\text{predModeIntra} == \text{INTRA\_DC}) ? ((wL[x] >> 4) + (wT[y] >> 4)) : 0$$

Otherwise, if predModeIntra is equal to INTRA_ANGULAR2 or INTRA_ANGULAR66, the following applies:

$$\text{ref}L[x][y] = p[-1][x+y+1]$$

$$\text{ref}T[x][y] = p[x+y+1][-1]$$

$$wT[y] = (32>>1) >> ((y<<1) >> n\text{Scale})$$

$$wL[x] = (32>>1) >> ((x<<1) >> n\text{Scale})$$

$$wTL[x][y] = 0$$

Otherwise, if predModeIntra is less than or equal to INTRA_ANGULAR10, the following ordered steps apply:
  The variables dXPos[y], dXFrac[y], dXInt[y] and dX[y] are derived as follows using invAngle as specified in clause 8.2.4.2.7 depending on intraPredMode:

$$dX\text{Pos}[y] = ((y+1) * \text{invAngle} + 2) >> 2$$

$$dX\text{Frac}[y] = dX\text{Pos}[y] \& 63$$

$$dX\text{Int}[y] = dX\text{Pos}[y] >> 6$$

$$dX[y] = x + dX\text{Int}[y]$$

The variables refL[x][y], refT[x][y], wT[y], wL[y] and wTL[x][y] are derived as follows:

$$\text{ref}L[x][y] = 0 \quad (886)$$

$$\text{ref}T[x][y] = (dX[y] < \text{ref}W - 1)?$$

$$((64 - dX\text{Frac}[y]) * \text{mainRef}[dX[y]] + dX\text{Frac}[y] * \text{mainRef}[dX[y]+1]+32) >> 6 \quad (887)$$

$$:0$$

$$wT[y] = (dX[y] < \text{ref}W - 1)?32 >> ((y<<1) >> n\text{Scale}):0 \quad (888)$$

$$wL[x] = 0 \quad (889)$$

$$wTL[x][y] = 0$$

Otherwise, if predModeIntra is greater than or equal to INTRA_ANGULAR58, the following ordered steps apply:
The variables dYPos[x], dYFrac[x], dYInt[x] and dY[x] are derived as follows using invAngle as specified in clause 8.2.4.2.7 depending on intraPredMode:

$dYPos[x]=((x+1)*invAngle+2)>>2$ $dYFrac[x]=dYPos[x]\&63$ $dYInt[x]=dYPos[x]>>6$ $dY[x]=x+dYInt[x]$ The variables refL[x][y], refT[x][y], wT[y], wL[y] and wTL[x][y] are derived as follows:

$refL[x][y]=(dY[x]<refH-1)?$ $((64-dYFrac[x])*sideRef[dY[x]]+dYFrac[x]*sideRef[dY[x]+1]+32)>>6$ $:0$ $refT[x][y]=0$ $wT[y]=0$ $wL[x]=(dY[x]<refH-1)?32>>((x<<1)>>nScale):0$ $wTL[x][y]=0$ Otherwise, refL[x][y], refT[x][y], wT[y], wL[y] and wTL[x][y] are all set equal to 0.

The values of the filtered samples filtSamples[x][y], with x=0 ... nTbW-1, y=0 ... nTbH-1 are derived as follows:

$filtSamples[x][y]=clip1Cmp((refL[x][y]*wL+refT[x][y]*wT-p[-1][-1]*wTL[x][y]+(64-wL[x]-wT[y]+wTL[x][y])*predSamples[x][y]+32)>>6)$ For the chroma component of an intra coded block, the encoder selects the best chroma prediction modes among five modes including Planar (mode index 0), DC (mode index 1), Horizontal (mode index 18), Vertical (mode index 50), Diagonal (mode index 66) and a direct copy of the intra prediction mode for the associated luma component, namely DM mode. The mapping between intra prediction direction and intra prediction mode number for chroma is shown in Table 1.

TABLE 1

Mapping between intra prediction direction and intra prediction mode for chroma

| intra chroma_pred_mode | IntraPredModeY[xCb + cbWidth/2][yCb + cbHeight/2 ] | | | | |
|---|---|---|---|---|---|
| [xCb][yCb] | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

To avoid duplicate mode, the four modes other than DM are assigned according the intra prediction mode of the associated luma component. When the intra prediction mode number for the chroma component is 4, the intra prediction direction for the luma component is used for the intra prediction sample generation for the chroma component. When the intra prediction mode number for the chroma component is not 4 and it is identical to the intra prediction mode number for the luma component, the intra prediction direction of 66 is used for the intra prediction sample generation for the chroma component.

Merge mode for Inter-picture prediction is used to indicate for a block that the motion data is inferred instead of being explicitly signaled. A merge candidate list of candidate motion parameters is firstly constructed, then an index is signaled which identifies the candidates to be used.

Merge candidate list includes a non sub-CU merge candidate list and a sub-CU merge candidate list. The non sub-CU merge candidates is constructed based on the spatial neighboring motion vectors, collocated temporal motion vectors, and history based motion vectors. Sub-CU Merge candidate list include affine merge candidates and ATMVP merge candidates. Sub-CU merge candidate is used to derive multiple MVs for current CU and different part of the samples in current CU can have different motion vectors.

Skip mode is used to indicate for a block that the motion data is inferred instead of being explicitly signaled and that the prediction residual is zero, i.e. no transform coefficients are transmitted. At the beginning of each CU in an inter-picture prediction slice, a skip flag is signaled that implies the following:
The merge mode is used to derive the motion data
No residual data is present in the bitstream
Multi-hypothesis intra-inter prediction combines one intra prediction and one merge indexed prediction, namely intra-inter prediction mode. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is removed from the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling.

The weights for combining predictions are described as follow. When DC or planar mode is selected or the Coding Block (CB) width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region. (w_intra1, w_inter1) is for the region closest to the reference samples and (w_intra4, w_inter4) is for the region farthest away from the reference samples. Then, the combined prediction can be calculated by summing up the two weighted predictions and right-shifting 3 bits. Moreover, the intra prediction mode for the intra hypothesis of predictors can be saved for the intra mode coding of the following neighboring CBs if they are intra coded.

Currently, for luma component, up to 4 intra prediction modes are employed for intra-inter prediction mode, which introduces too much complexity.

Currently, for intra-inter mode, one buffer is used to store the inter prediction values, and one additional buffer is added to store the intra prediction values, which increase the decoder memory cost.

For current intra-inter mode, both intra prediction and inter prediction needs to be performed, and multiplications are involved in the intra prediction process, which adds additional complexity for the decoder.

For current intra-inter mode, the weightings are fixed values for different block sizes which may not be optimal and could be improved.

The weightings (w_intra, w_inter) applied in multi-hypothesis are selected depending on the relative position of samples within the block. However, this selection may be not very reliable or flexible.

The weightings (w_intra, w_inter) applied in multi-hypothesis may have a correlation with whether the neighboring block is intra coded or inter coded. By considering whether above or left neighboring blocks are intra coded or inter coded, the weighting may be selected more efficiently.

Therefore, there is a desire for a technical solution to such problems.

SUMMARY

There is included a method and apparatus comprising memory configured to store computer program code and a hardware processor or processors configured to access the computer program code and operate as instructed by the computer program code. The computer program includes selecting code configured to cause the processor to select a set of weightings in an intra-inter mode, and applying code configured to cause the processor to apply position dependent intra prediction combination (PDPC) to modify at least one of an inter prediction sample and a reconstructed sample of an inter coded coding unit (CU).

According to exemplary embodiments, the applying code is further configured to cause the processor to apply the PDPC comprises by modifying only a luma component of the inter coded CU.

According to exemplary embodiments, the signaling code is further configured to cause the processor to signal an interPDPCFlag in response to determining that a coding block (CB) is coded by a Merge mode.

According to exemplary embodiments, the applying code is further configured to cause the processor to apply PDPC to reconstructed samples before applying any of in-loop deblocking filters comprising deblocking, sample adaptive offset (SAO), and adaptive loop filter (ALF).

According to exemplary embodiments, the program code further comprises assigning code configured to cause the processor to assign a default intra prediction mode to a current coding block (CB), and the applying code is further configured to cause the processor to apply the default intra prediction mode to CBs, following the current CB, for at least intra mode coding and most probable mode (MPM) derivation.

According to exemplary embodiments, the applying code is further configured to cause the processor to apply sets of PDPC filters to at least one of inter prediction samples, other than the inter prediction sample, and reconstructed samples of inter coded CUs other than the reconstructed sample of the inter coded CU, and each of the PDPC filters are defined for respective ones of a plurality of block sizes.

According to exemplary embodiments, the signaling code is further configured to cause the processor to: signal at least one interPDPCFlag indicating whether to applying PDPC, determine whether the interPDPCFlag is set equal to true, in response to determining that the interPDPCFlag is set equal to a first value, signal a second flag indicating at least one of the PDPC filters to be applied, after inter prediction, to the at least one of inter prediction samples and reconstructed samples of inter coded CUs, and in response to determining that the interPDPCFlag is set equal to a second value, determine to exclude PDPC from the at least one of inter prediction samples and reconstructed samples of inter coded CUs.

According to exemplary embodiments, the program code further comprises signaling code configured to cause the processor to select whether the weightings are equal to each other, and weighting code configured to cause the processor to weight, in response to determining that the signaling indicates that the weightings are unequal, an inter-prediction in PDPC filtering depending on whether neighboring blocks are any of intra coded, inter coded, and intra-inter coded.

According to exemplary embodiments, intra prediction is absent from the intra-inter mode, and the intra-inter mode comprises applying PDPC directly on top of inter-prediction, and applying PDPC directly on top of inter-prediction comprises:

$$\text{pred}(x,y) = (w\_intra * wL \times R-1, y + w\_intra * wT \times Rx, -1 - w\_intra * wTL \times R-1, -1 + (N - w\_intra * wL - w\_intra * wT + w\_intra * wTL) \times \text{InterPred}(x,y) + N/2) >> \log 2(N)$$

where InterPred indicates an input inter prediction, w_intra is selected from a set of predefined values depending on whether the neighboring blocks are at least one of intra coded, inter coded, and intra-inter coded, and where N indicates one of 8, 16, 32, 64, 128, and 256.

BRIEF DESCRIPTION OF THE DRAWINGS

Further features, nature, and various advantages of the disclosed subject matter will be more apparent from the following detailed description and the accompanying drawings in which:

FIGS. 1-8, 9A, and 9B are schematic illustrations of diagrams in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium. In the present disclosure, most probable mode (MPM) can refer to a primary MPM, a secondary MPM, or both a primary and a secondary MPM.

Figure 1:
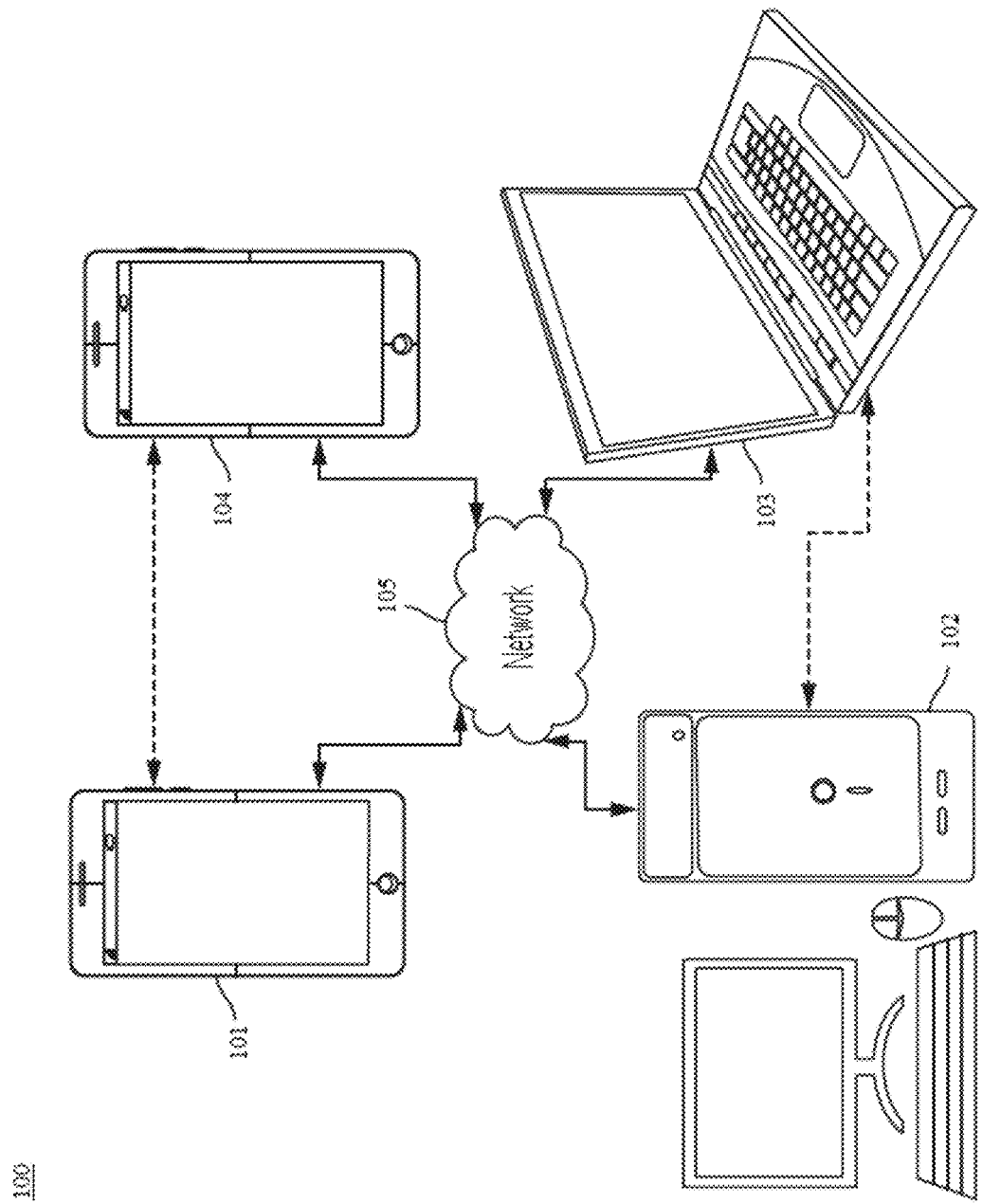

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
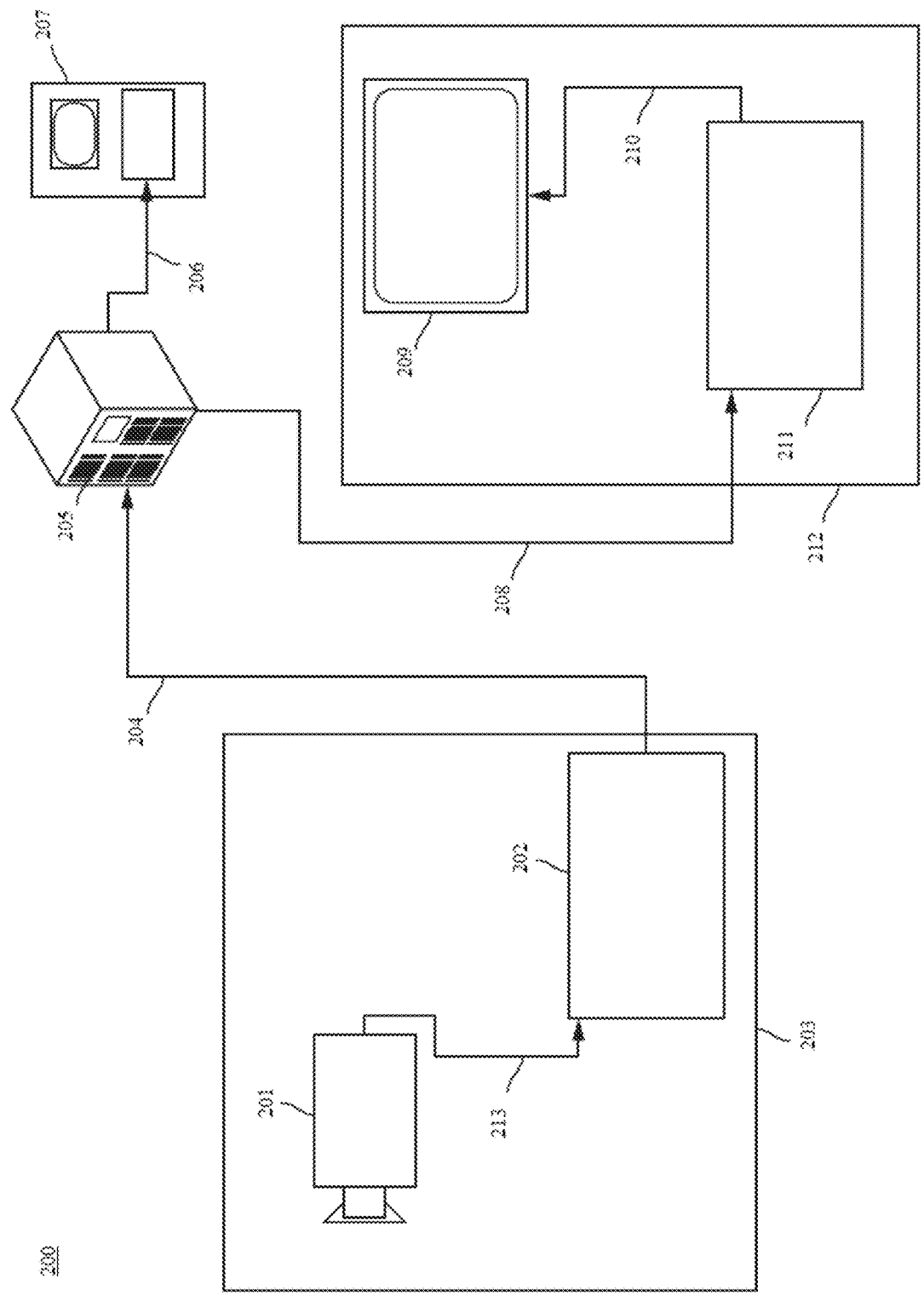

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213, depicted as a bold line to emphasize a high data volume when compared to encoded video bitstreams, can be processed by an encoder 202 coupled to the camera 201. The encoder 202 can include hardware, software, or a combination thereof to enable or implement aspects of the disclosed subject matter as described in more detail below. The encoded video bitstream 204, depicted as a thin line to emphasize the lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
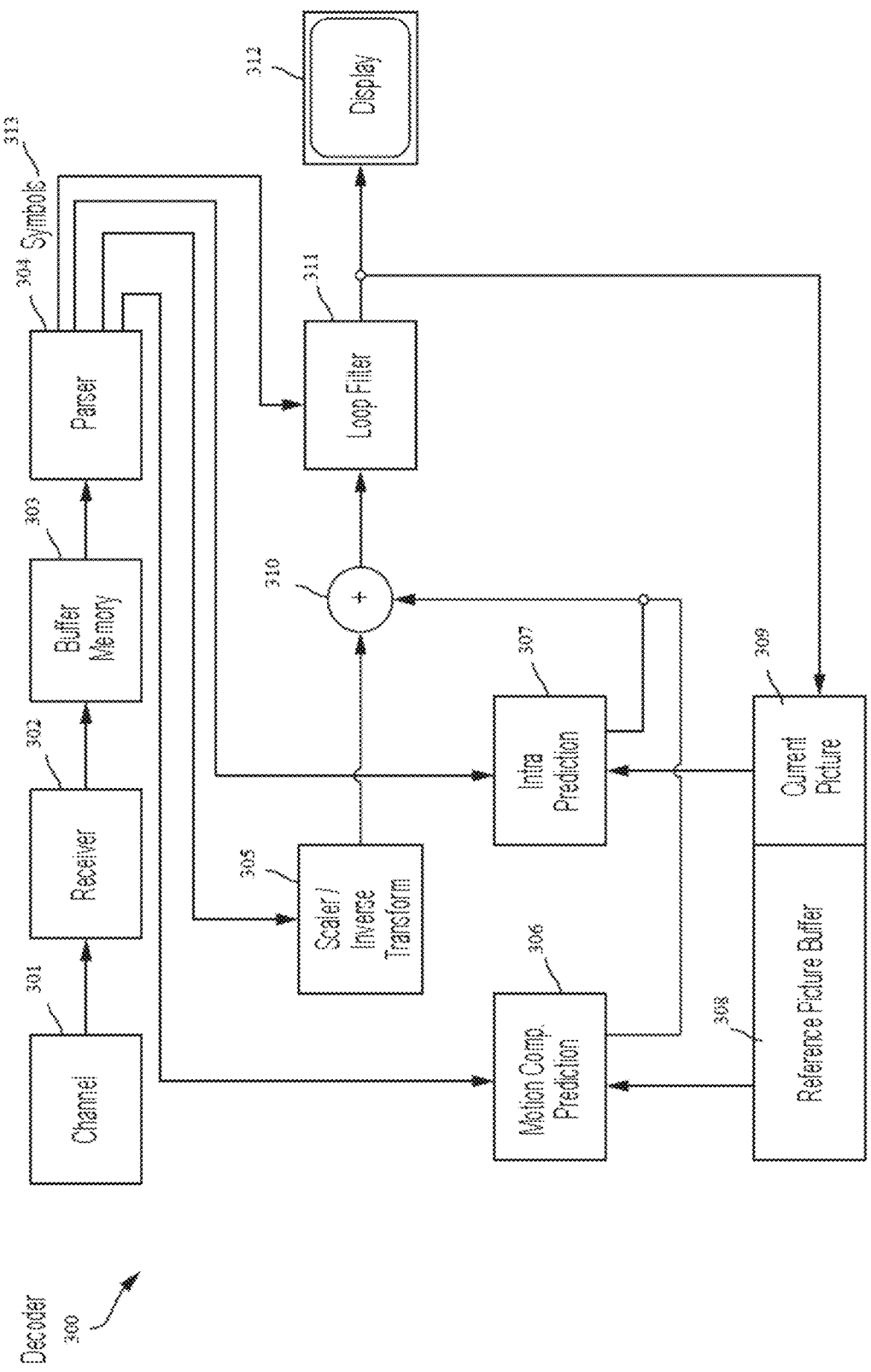

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 200 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
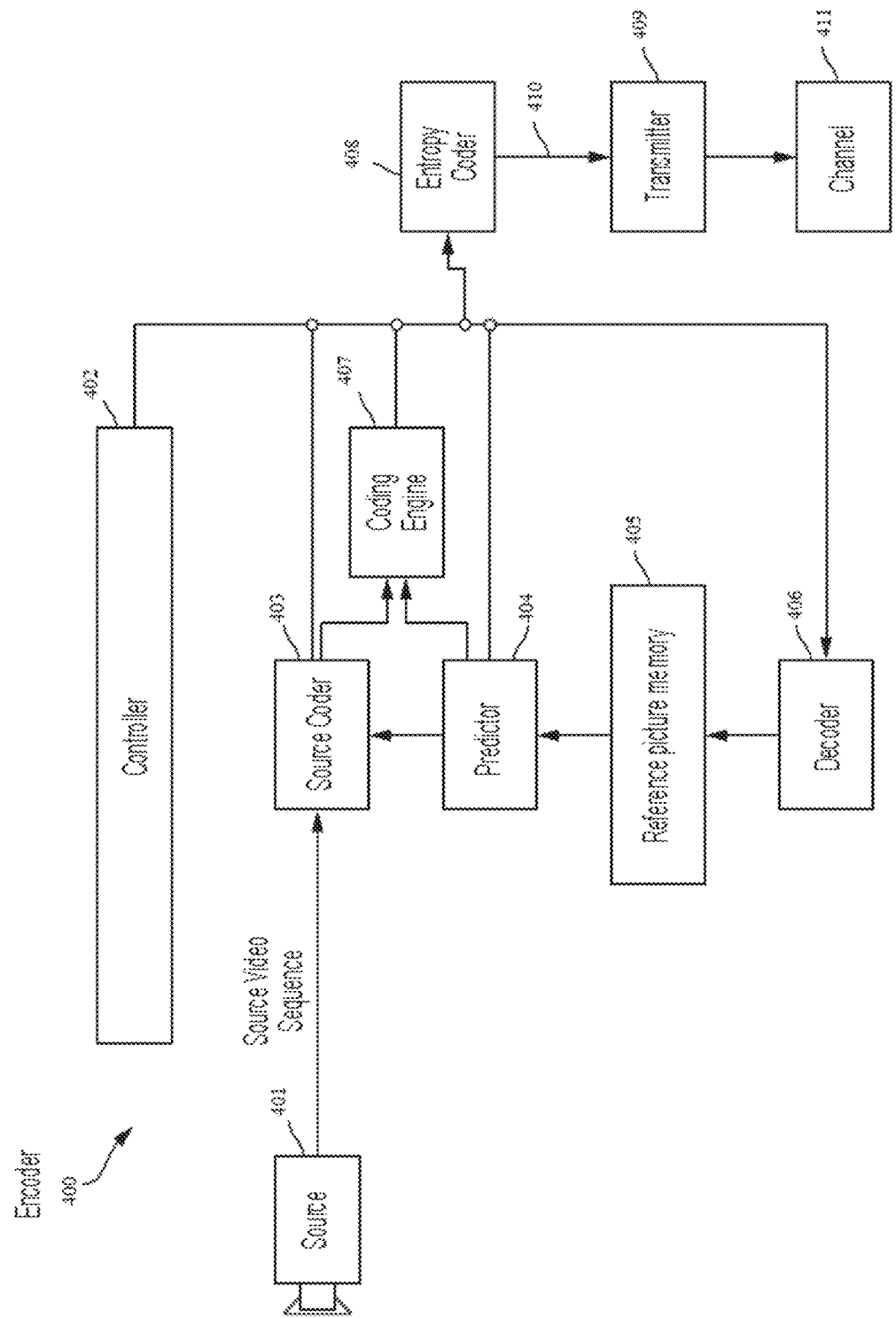

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence (s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The video coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1 (b), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an MPM list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
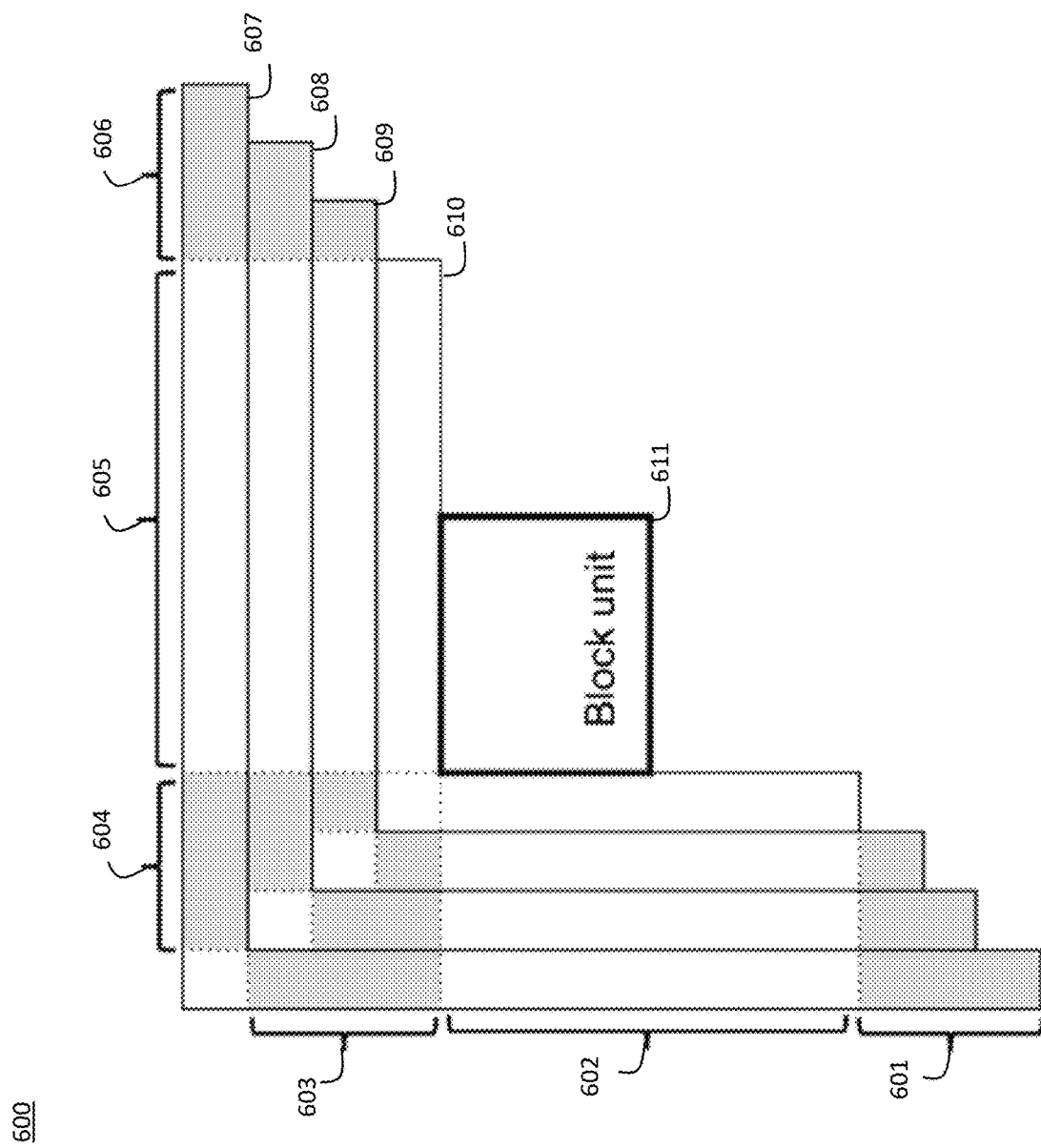

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 209, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x, y) is calculated as follows:

$$\text{pred}[x][y]=(wL*R_{-1,y}+wT*R_{x,-1}+wTL*R_{-1,-1}+(64-wL-wT-wTL)*\text{pred}[x][y]+32)>>6 \quad \text{(Eq. 2-1)}$$

where $R_{x,-1}$, $R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT=32>>((y<<1)>>\text{shift}) \quad \text{(Eq. 2-2)}$$

$$wL=32>>((x<<1)>>\text{shift}) \quad \text{(Eq. 2-3)}$$

$$wTL=-(wL>>4)-(wT>>4) \quad \text{(Eq. 2-4)}$$

$$\text{shift}=(\log 2(\text{width})+\log 2(\text{height})+2)>>2 \quad \text{(Eq. 2-5).}$$

Figure 7:
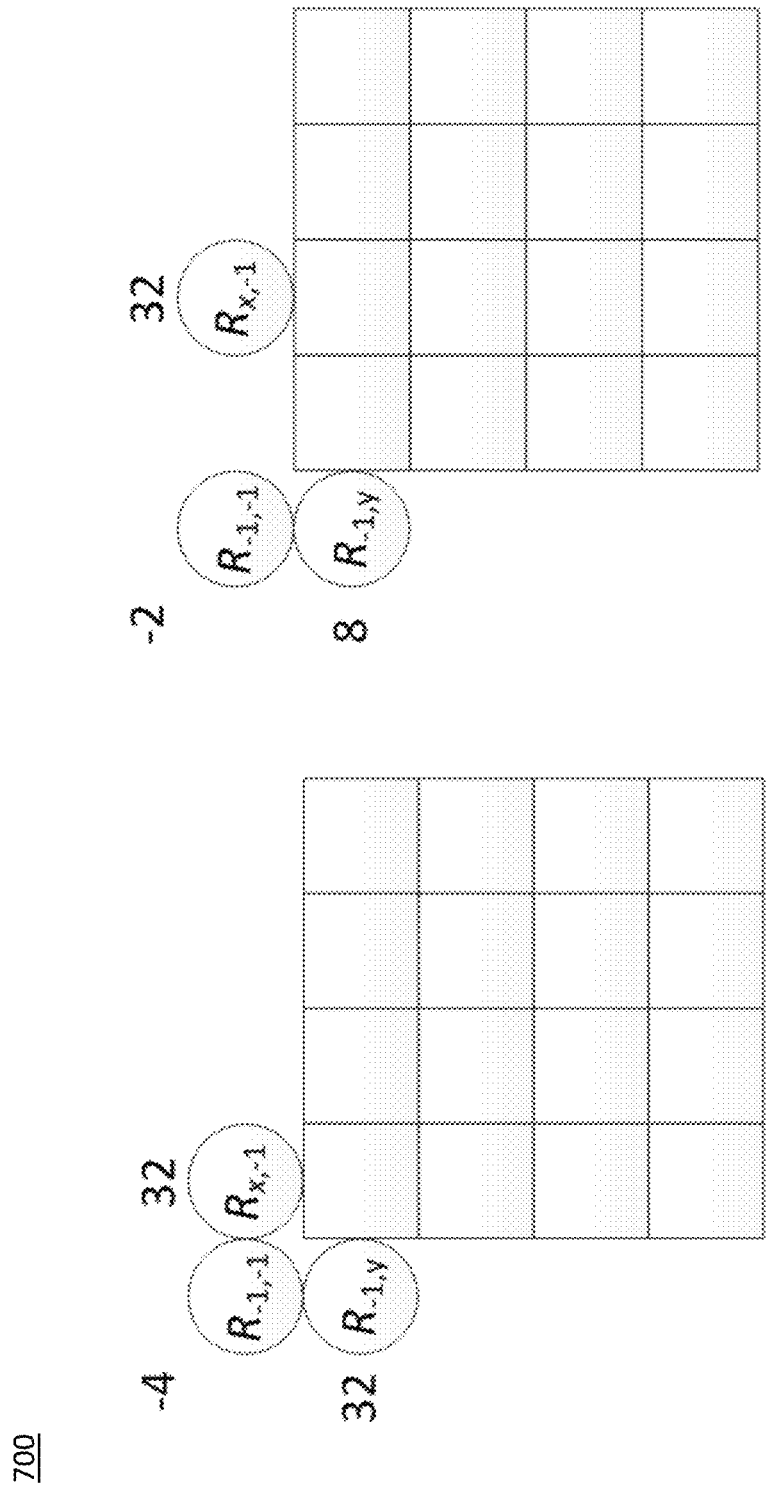

FIG. 7 illustrates a diagram 700 in which DC mode PDPC weights (wL, wT, wTL) for (0, 0) and (1, 0) positions inside one 4×4 block. If PDPC is applied to DC, planar, horizontal, and vertical intra modes, additional boundary filters are not needed, such as the HEVC DC mode boundary filter or horizontal/vertical mode edge filters. FIG. 7 illustrates the definition of reference samples Rx,−1, R−1,y and R−1,−1 for PDPC applied to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1.

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 9B:
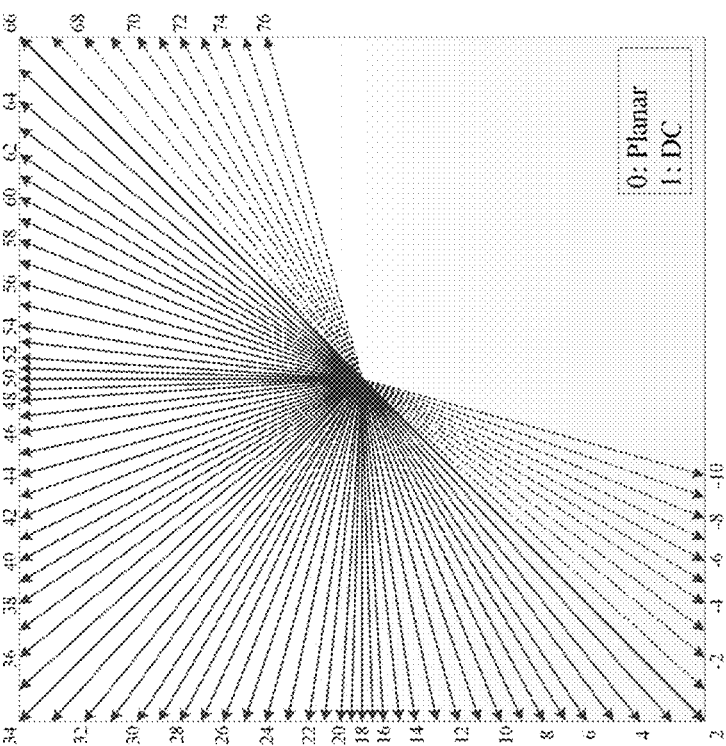
Figure 9A:
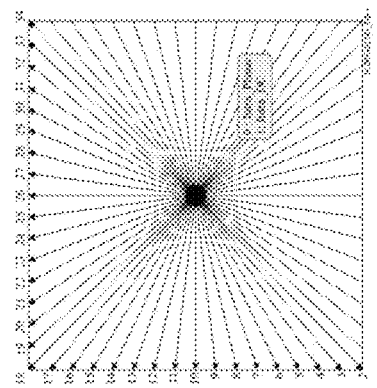

FIG. 9A illustrates intra prediction modes 900 used in HEVC. In HEVC, there are total 35 intra prediction modes, among which mode 10 is horizontal mode, mode 26 is vertical mode, and mode 2, mode 18 and mode 34 are diagonal modes. The intra prediction modes are signalled by three most probable modes (MPMs) and 32 remaining modes.

FIG. 9B illustrates, in embodiments of VVC, there are total 87 intra prediction modes where mode 18 is horizontal mode, mode 50 is vertical mode, and mode 2, mode 34 and mode 66 are diagonal modes. Modes −1∼−10 and Modes 67∼76 are called Wide-Angle Intra Prediction (WAIP) modes.

The prediction sample pred(x,y) located at position (x, y) is predicted using an intra prediction mode (DC, planar, angular) and a linear combination of reference samples according to the PDPC expression:

$$\text{pred}(x,y)=(wL \times R_{-1,y}+wT \times R_{x,-1}-wTL \times R_{-1,-1}+(64-wL-wT+wTL) \times \text{pred}(x,y)+32)>>6$$

where $R_{x,-1}$, $R_{-1,y}$ represent the reference samples located at the top and left of current sample (x, y), respectively, and $R_{-1,-1}$ represents the reference sample located at the top-left corner of the current block.

For the DC mode the weights are calculated as follows for a block with dimensions width and height:

$$wT=32>>((y<<1)>>n\text{Scale}), \quad wL=32>>((x<<1)>>n\text{Scale}), \quad wTL=(wL>>4)+(wT>>4),$$

with nScale=(log 2(width)−2+log 2(height)−2+2)>>2, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For planar mode wTL=0, while for horizontal mode wTL=wT and for vertical mode wTL=wL. The PDPC weights can be calculated with adds and shifts only. The value of pred(x,y) can be computed in a single step using Eq. 1.

Figure 10:
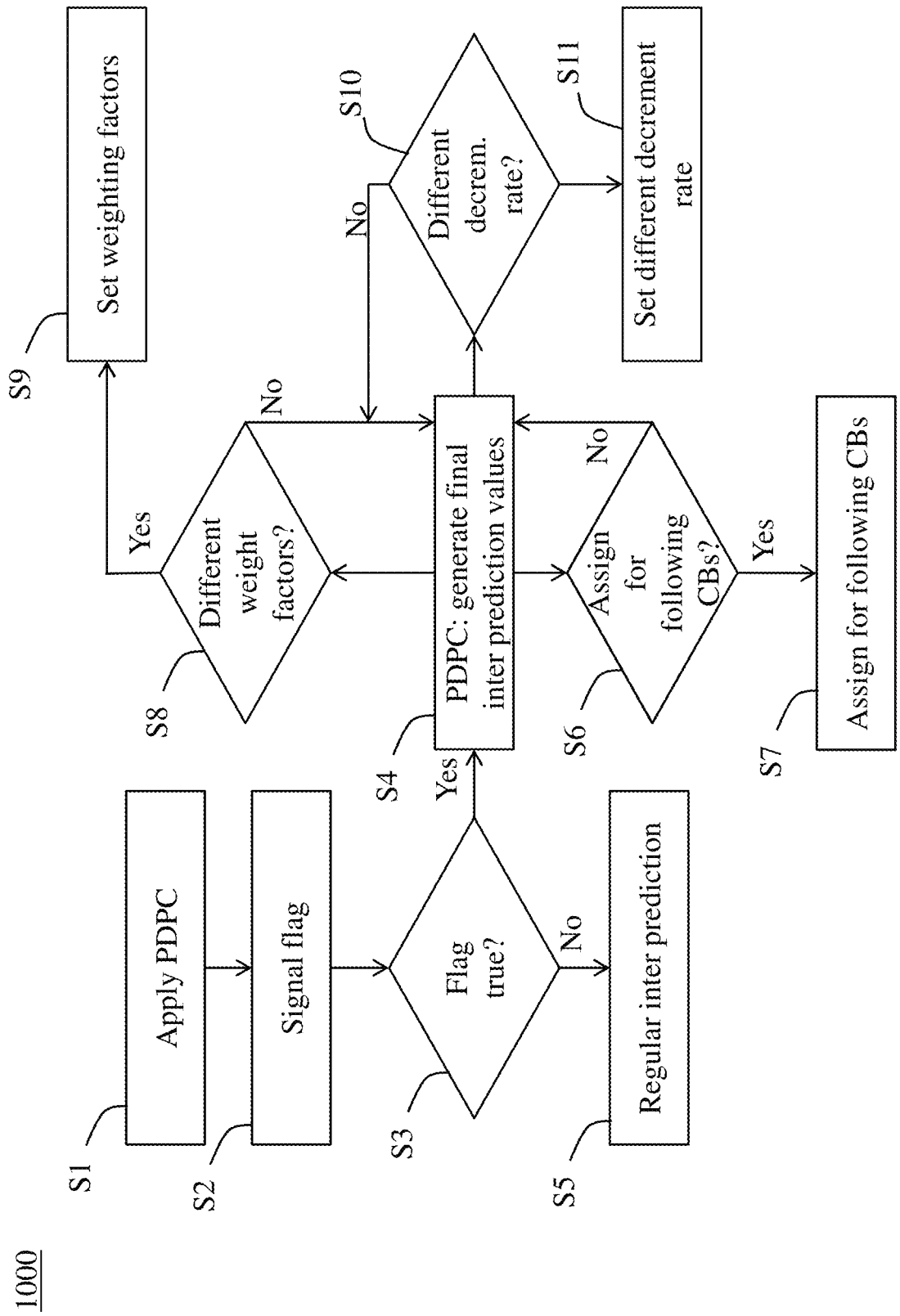
FIGS. 10-13 are simplified flow charts in accordance with embodiments.

FIG. 10 illustrates a flowchart 1000 according to exemplary embodiments, where at S1, it is considered to apply PDPC to inter prediction samples or to reconstructed samples of a inter coded CU. When applying PDPC to inter prediction samples or reconstructed samples of an inter coded CU, the prediction samples or reconstructed samples of an inter coded CU are further modified in the PDPC process.

At S2, a flag, such as an interPDPCFlag, is signaled to indicate whether to apply PDPC or not. According to embodiments, the interPDPCFlag may be signaled at the CU level to indicate whether to apply PDPC to inter prediction samples or reconstructed samples of an inter coded CU, and according to other embodiments, the interPDPCFlag is signaled at the TU level to indicate whether to apply PDPC to interprediction samples or reconstructed samples of an inter coded CU. Further, the interPDPCFlag may be signaled only when a current CU is determined to be neither an intra coded CU nor a skipped CU.

According to embodiments at S2, the interPDPCFlag may be only signaled for a coding block coded by a Merge mode, and this flag may be signaled before or after a merge index such that, according to embodiments the PDPC is not applied to a skip CU, and/or such that the PDPC is not applied to either the skip CU nor a sub-block merge CU.

At S3, it is considered whether the interPDPCFlag is set equal to true, after inter prediction or reconstruction of an inter coded CU, and if so, at S4, PDPC is applied to inter prediction samples or reconstructed samples of an inter-coded CU to generate final prediction values or reconstructed samples of an inter coded CU.

According to embodiments at S4, when applying PDPC to reconstructed samples, PDPC is applied to the reconstructed samples before an application of any of in-loop deblocking filters, such as deblocking, Sample Adaptive Offset (SAO), and Adaptive Loop Filer (ALF), etc.

According to embodiments when at S3 the interPDPCflag is set equal to true, at S4, deblocking and SAO are not applied to a top and left boundary of a current CU, and according to other embodiments when at S3 the interPDPC flag is set equal to true, any other filter except PDPC is not applied to the top and left boundary of the current CU.

Otherwise, at S5, after inter prediction or reconstruction of an inter coded CU, PDPC is not applied to inter prediction samples or reconstructed samples of an inter coded CU, and instead, a regular inter prediction process may be used.

According to embodiments, it could be determined and applied that PDPC is only applied on a luma component of an inter coded CU.

According to embodiments, at S6, it may be determined, when applying PDPC to inter prediction samples or reconstructed samples of an inter coded CU to the current CB, whether to assign, at S7, a default intra prediction mode to the current CB such that following CBs may use that default intra prediction mode for intra mode coding and Most Probable Mode (MPM) derivation. For example, the default intra prediction mode may be any of Planar or DC mode.

At S8, it may be determined whether different initial weighting factors of PDPC are used for regular intra, at S5, and the PDPC at S4, and if so, at S9, weighting factors may be set to 16, 8, 4, 2, or 1, for the PDPC at S4. According to embodiments, when applying PDPC to inter prediction samples or reconstructed samples of an inter coded CU of a current CB, the intra prediction mode may be marked as not available, so that the current CB may not be considered as an intra coded block for the following neighboring block, and it may not be utilized for the intra mode coding or MPM derivation for a following neighboring block.

According to embodiments, when applying PDPC to inter prediction samples or reconstructed samples of an inter coded CU at S5, a weighting factor decrement rate and/or initial weighting factors may be considered at S10 and set at S11 to a different value rather than one used in an original PDPC in intra prediction.

According to embodiments at S11, a weighting factor decrement rate may be set equal to a fixed value N, which is not dependent on the block size of current coding unit, N can be any integer equal to or greater than 0. For example, N may be set equal to 0, 1, 2, 3, or 4.

According to embodiments at S11, a weighting factor decrement rate may be set equal to a fixed value N1 when block size (width*height) is equal to or less than Thres_1. Otherwise, weighting factor decrement rate may be set equal to another fixed value N2. N1 and N2 can be any integer equal to or greater than 0. For example, N1 is set equal to 1, and N2 is set equal to 2. Thres_1 can be any positive integer, such as 32, 64, 128, 256, 512, or 1024.

According to embodiments at S11, a weighting factor decrement rate may be set equal to ((Log 2(nTbW)+Log 2(nTbH)+S)>>2), S can be any integer, such as −3, −2, −1, 0, 1, 2 or 3.

According to embodiments at S11, a weighting factor decrement rate may have different values for x-axis (from left to right) and y-axis (from top to bottom) when PDPC is applied to inter prediction samples. For example, the weighting factor decrement rate in the x-axis may be related to the width of current CB, such as Log 2(nTbH)+S1)>>1, and the weighting factor decrement rate in the y-axis may be related to the height of current CB, such as Log 2(nTbW)+S2)>>1. S1 and S2 may be any integer, such as −3, −2, −1, 0, 1, 2, or 3.

Further, with embodiments according to FIG. 10, whether it is allowed to apply PDPC on top of an inter prediction block or inter reconstructed block may be signaled in the high-level syntax elements, including, but not limited to SPS (Sequence Parameter Set), PPS (Picture Parameter Set), Slice header, CTU header, and one flag can be signaled to indicate whether it may be allowed to apply PDPC on top of a luma inter prediction block or inter reconstructed block, and another flag may be signaled to indicate whether it is allowed to apply PDPC on top of a Chroma inter prediction block or inter reconstructed block).

Figure 11:
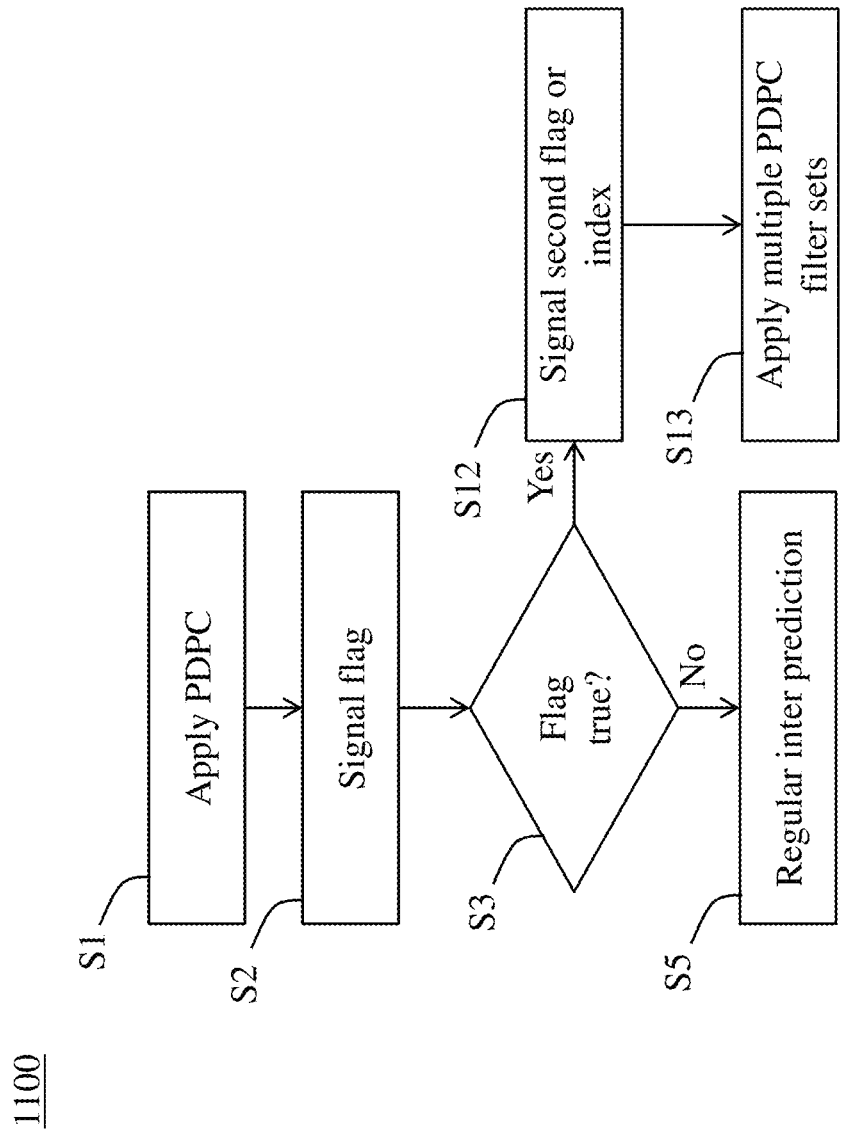

FIG. 11 illustrates a flowchart 1100 according to exemplary embodiments, according to or separate from those of FIG. 10 in which S1, S2, S3, and S4 may be similar, and at S3, if it is determined that the flag is set equal to true, then at S12, a second flag or index may be signaled. The flowchart 1100 relates to applying multiple PDPC filter sets to inter prediction samples (or reconstructed samples of an inter coded CU). Multiple sets of PDPC filters may be defined for each block size, and when applying PDPC to inter prediction samples or reconstructed samples of an inter coded CU, the prediction samples in the PDPC process may be modified to inter prediction samples or reconstructed samples of an inter coded CU. The selection of a PDPC filter is signaled for a coding block that may apply the PDPC.

At S12, according to embodiments, one flag, namely interPDPCFlag, may be signaled at S2 to indicate whether to apply PDPC or not. If interPDPCFlag is set equal to true at S3, then a second flag or index may be signaled to indicate which PDPC filter is utilized, after inter prediction. The specified filter type may be applied to inter prediction samples or reconstructed samples of an inter coded CU to generate a final inter prediction values or reconstructed samples of an inter coded CU.

At S13, according to embodiments, there may be N different PDPC filter types which may be signaled with unary truncated coding or fixed length coding where N can be any positive integer, such as 2, 3, or 4.

At S13 according to embodiments, a number of PDPC filter types may depend on coded information, including but not limited to block width, block height, block width to height ratio, block area size, whether the current block is uni-predicted or uni-predicted, whether the current block is coded using MERGE mode or AMVP mode.

At S13 according to embodiments, different PDPC filter types may be specified by the weighting factor decrement rate or scaling factor, and/or the initial weighting factor of the top and/or left, and/or top-left weightings which is assigned the top-left sample of current block. For example, a weighting factor decrement rate may be set to ((Log 2(nTbW)+Log 2(nTbH)−2+S)>>2), where S can be any integer, and S has different setting for different PDPC filter type. In embodiments, a weighting factor decrement rate may be set to N for each PDPC filter type, where N can be any integer, and N may have different setting for different PDPC filter type. In embodiments, a derivation of weighting factor decrement rate can use the method described in when there are N different PDPC filter types, and the initial value of weighting factor can be 32, 16, 8, 4, 2, 1 or 0. In further embodiments, only the initial values of weighting factors may be different for different PDPC filter types, and example values of the initial values of weighting factor may include, but are not limited to: 32, 16, 8, 4, 2, 1 or 0.

Additionally with S13, and similar to S6 and S7, when applying PDPC to inter prediction samples or reconstructed samples of an inter coded CU, a default intra prediction mode may be assigned to a current CB, so that the following CBs can use this default intra prediction mode for the MPM derivation, and the default intra prediction mode may be a Planar or DC mode.

Figure 12:
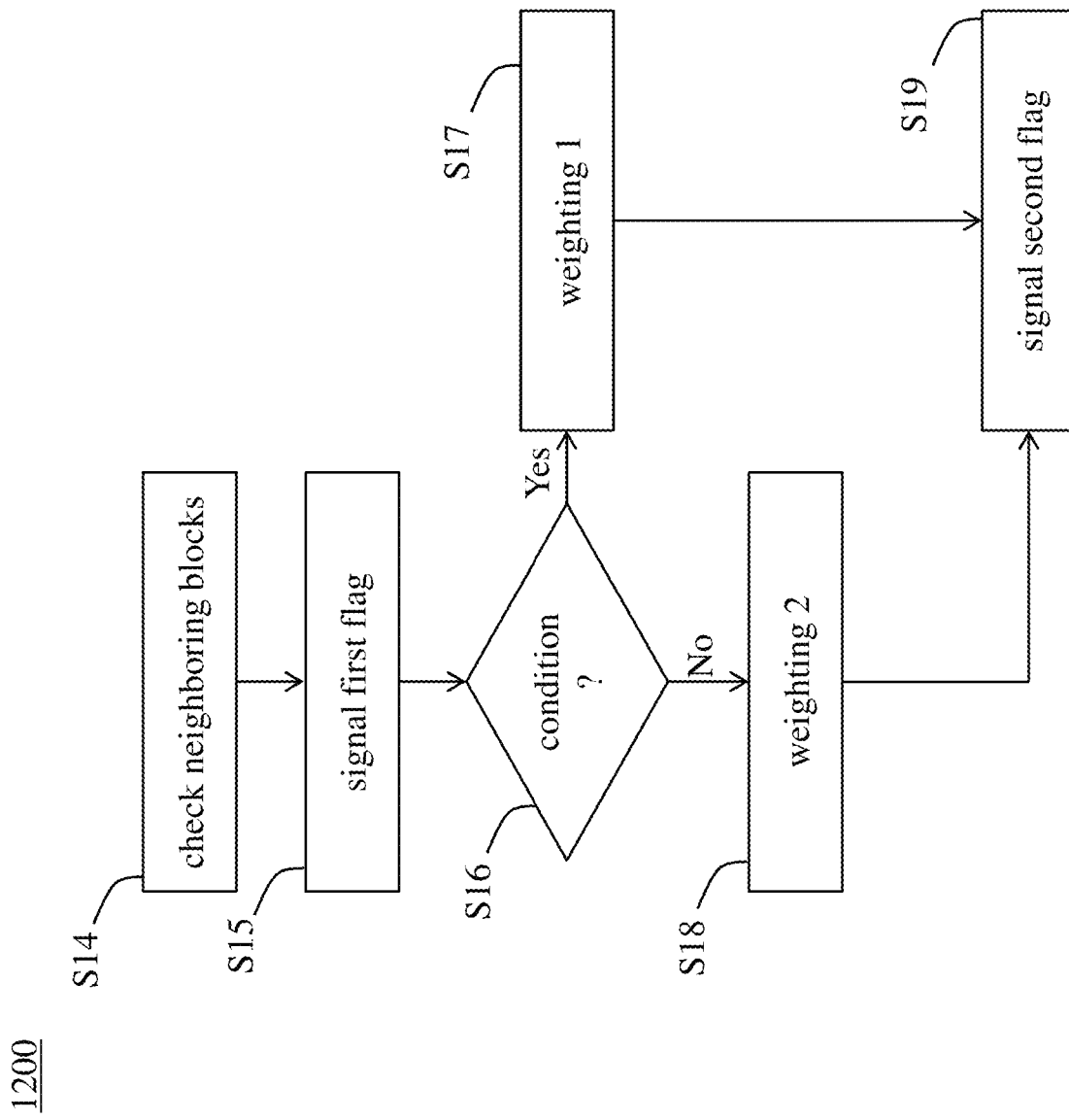

FIG. 12 illustrates a flowchart 1200 relating to a multi-hypothesis intra-inter prediction called intra-inter mode or also called inter-intra mode, or combined merge and intra prediction mode. A weighting with identical weighting applied for intra prediction and inter prediction, is called an equal weighting, e.g. (w_intra, w_inter)=(1, 1), or (w_intra, w_inter)=(4, 4) are both equal weighting, where w_intra is the weighting applied on intra prediction and w_inter is the weighting applied on inter prediction.

At S14, for the weightings applied intra-inter mode, i.e., w_intra and w_inter, there is begun a process to determine a set of weightings, and signal the selection of weighting for a block which is coded by intra-inter mode. At S14 the parameters of neighboring blocks may be checked, and at S15 a first flag may be signaled to indicate whether an equal weighting is used. According to embodiments, the context for entropy coding the first flag, depends on whether the neighboring blocks are intra coded or inter coded, or intra-inter code. According to embodiments, the context for entropy coding this first flag depends on whether one of the above and left neighboring blocks is intra coded. According to embodiments, the context for entropy coding this first flag depends on whether one of the above and left neighboring blocks is intra coded or intra-inter coded. According to embodiments, the context for entropy coding this first flag depends on whether one of the above and left neighboring blocks is inter coded.

For example at S16, it may be determined whether some condition is met. If the first flag is signaled with a value which indicates that an equal weighting is not applied, the weighting is selected depending on whether the neighboring blocks are intra coded or inter coded, or intra-inter coded.

According to exemplary embodiments, if any of the exemplary conditions described below are met, then one weighing is applied at S17, such as an example candidate weighting (w_intra, w_inter)=(3, 1), and if any of the exemplary conditions described below are not met, then one weighing is applied at S18, such as an example candidate weighting (w_intra, w_inter)=(1, 3).

The conditions at S16 may be considered depending on any of whether the context for entropy coding this first flag depends on whether both the above and left neighboring blocks are both intra coded, whether the context for entropy coding this first flag depends on whether both the above and left neighboring blocks are both intra coded or intra-inter coded, and whether the context for entropy coding this first flag depends on whether both the above and left neighboring blocks are both inter coded. However, according to exemplary embodiments, if the context for entropy coding this first flag depends on whether both the above and left neighboring blocks are both inter coded then the weighting can be set to (w_intra, w_inter)=(1, 3) in contrast to the other embodiments described above.

At S19, a second flag may be signaled to indicate which one of a set of candidate weightings may be used. According to embodiments, the context for entropy coding of the second flag depends on whether the neighboring blocks are intra coded or inter coded, or intra-inter code. For example, if both above and left neighboring blocks are intra coded, context value may be set as a first value, otherwise, if one of above and left neighboring blocks are intra coded, context value may be set as a second value, otherwise, if none of above and left neighboring blocks are intra coded, context value may be set as a third value. According to other embodiments, if both above and left neighboring blocks are intra coded or intra-inter coded, context value may be set as a first value, otherwise, if one of above and left neighboring blocks are intra coded or intra-inter coded, a context value may be set as a second value, otherwise, if none of above and left neighboring blocks are intra coded, context value may be set as a third value. According to embodiments, a set of candidate weightings may include (w_intra, w_inter)=(1, 3) and (w_intra, w_inter)=(3, 1).

Figure 13:
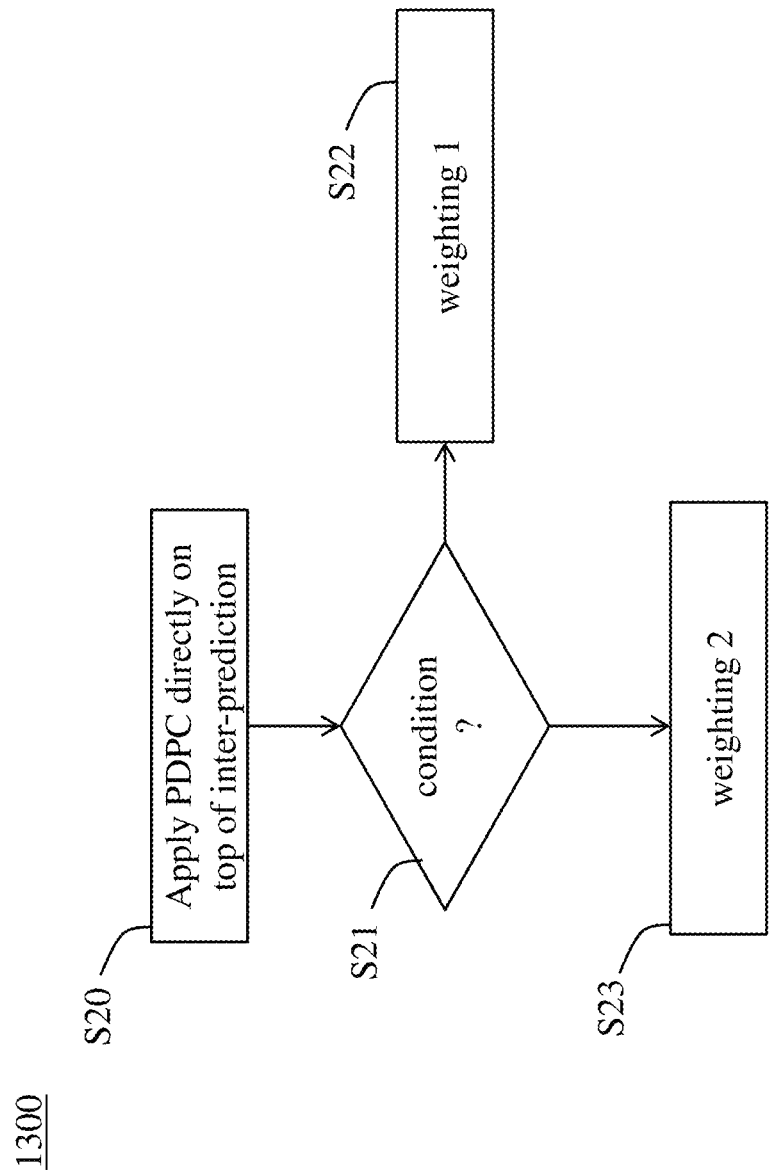

FIG. 13 shows a flowchart 1300 where at S20 intra prediction is not used in intra-inter mode, and instead, PDPC is directly applied on top of inter-prediction; however, the weighting applied on inter-prediction in the PDPC filtering depends on whether the neighboring blocks are intra coded or inter coded, or intra-inter coded.

According to embodiments at S21 the PDPC is directly applied on top of inter-prediction as follows:

$$\text{pred}(x,y)=(w\_intra*wL\times R_{-1,y}+w\_intra*wT\times R_{x,-1}-w\_intra*wTL\times R_{-1,-1}+(N-w\_intra*wL-w\_intra*wT+w\_intra*wTL)\times \text{InterPred}(x,y)+N/2)>>\log 2(N)$$

where InterPred is the input inter prediction, and w_intra is selected from a set of pre-defined values, and the selection depends on whether the neighboring blocks are intra coded or inter coded, or intra-inter coded. Example values of N includes 8, 16, 32, 64, 128, 256. If the neighboring blocks satisfy that condition then a weighting 1 may be applied at S22 and if the neighboring blocks do not satisfy that condition than a weighting 2 may be applied at S23.

According to an embodiments at S21 the PDPC is directly applied on top of inter-prediction as follows:

$$\text{pred}(x,y)=(w\_intra*wL\times R_{-1,y}+w\_intra*wT\times R_{x,-1}+(N-w\_intra*wL-w\_intra*wT)\times \text{InterPred}(x,y)+(N/2))>>\log 2(N)$$

where InterPred is the input inter prediction, and w_intra is selected from a set of pre-defined values, and the selection depends on whether the neighboring blocks are intra coded or inter coded, or intra-inter coded. Example values of N includes 8, 16, 32, 64, 128, 256. If the neighboring blocks satisfy that condition then a weighting 1 may be applied at S22 and if the neighboring blocks do not satisfy that condition than a weighting 2 may be applied at S23.

According to embodiments at S21 the PDPC is directly applied on top of inter-prediction as follows:

$$\text{pred}(x,y)=(w\_intra*wL\times R_{-1,y}+w\_intra*wT\times R_{x,-1}+(N*(w\_intra+w\_inter)-w\_intra*wL-w\_intra*wT)\times \text{InterPred}(x,y)+(N/2)*((w\_intra+w\_inter)))>>(\log 2(N)+\log 2(w\_intra+w\_inter))$$

where InterPred is the input inter prediction, and w_intra is selected from a set of pre-defined values, and the selection depends on whether the neighboring blocks are intra coded or inter coded, or intra-inter coded. For example, when w_intra=3 and w_inter=1, the above equation can be re-written as:

$$\text{pred}(x,y)=(3*wL\times R_{-1,y}+3*wT\times R_{x,-1}+(N*4-3*wL-3*wT)\times \text{InterPred}(x,y)+2*N)>>(\log 2(N)+2)$$

Example values of N includes 8, 16, 32, 64, 128, 256.

According to embodiments at S21, a weighting applied n the above reference sample (wT) in PDPC depends on whether the above neighboring blocks are intra coded or inter coded, or intra-inter coded, and the weighting applied on the left reference sample (wL) in PDPC depends on whether the left neighboring blocks are intra coded or inter coded, or intra-inter coded.

According to embodiments at S21, the PDPC is directly applied on top of inter-prediction as follows:

$$\text{pred}(x,y)=w\_intraL*wL\times R_{-1,y}+w\_intraT*wT\times R_{x,-1}-w\_intraTL*wTL\times R_{-1,-1}+(N-w\_intraL*wL-w\_intraT*wT+w\_intraTL*TL)\times \text{InterPred}(x,y)+N/2)>>\log 2(N)$$

where InterPred is the input inter prediction, and w_intraL is selected from a set of pre-defined values, and the selection depends on whether the left neighboring blocks are intra coded or inter coded, or intra-inter coded, w_intraT is selected from a set of pre-defined values, and the selection depends on whether the top neighboring blocks are intra coded or inter coded, or intra-inter coded, w_intraTL is selected from a set of pre-defined values, and the selection depends on whether the top-left neighboring blocks are intra coded or inter coded, or intra-inter coded. Example values of N includes 8, 16, 32, 64, 128, 256. If the neighboring blocks satisfy that condition then a weighting 1 may be applied at S22 and if the neighboring blocks do not satisfy that condition than a weighting 2 may be applied at S23.

According to embodiments at S21, the PDPC is directly applied on top of inter-prediction as follows:

$$\text{pred}(x,y)=(w\_intraL*wL\times R_{-1,y}+w\_intraT*wT\times R_{x,-1}+(N-w\_intraL*wL-w\_intraT*wT)\times \text{InterPred}(x,y)+N/2)>>\log 2(N)$$

where InterPred is the input inter prediction, and w_intraL is selected from a set of pre-defined values, and the selection depends on whether the left neighboring blocks are intra coded or inter coded, or intra-inter coded, w_intraT is selected from a set of pre-defined values, and the selection depends on whether the top neighboring blocks are intra coded or inter coded, or intra-inter coded. Example values of N includes 8, 16, 32, 64, 128, 256. If the neighboring blocks satisfy that condition then a weighting 1 may be applied at S22 and if the neighboring blocks do not satisfy that condition than a weighting 2 may be applied at S23

Accordingly, by exemplary embodiments described herein, the technical problems noted above may be advantageously improved upon by these technical solutions.

The techniques described above, can be implemented as computer software using computer-readable instructions and physically stored in one or more computer-readable media or by a specifically configured one or more hardware processors. For example, FIG. 14 shows a computer system 1400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
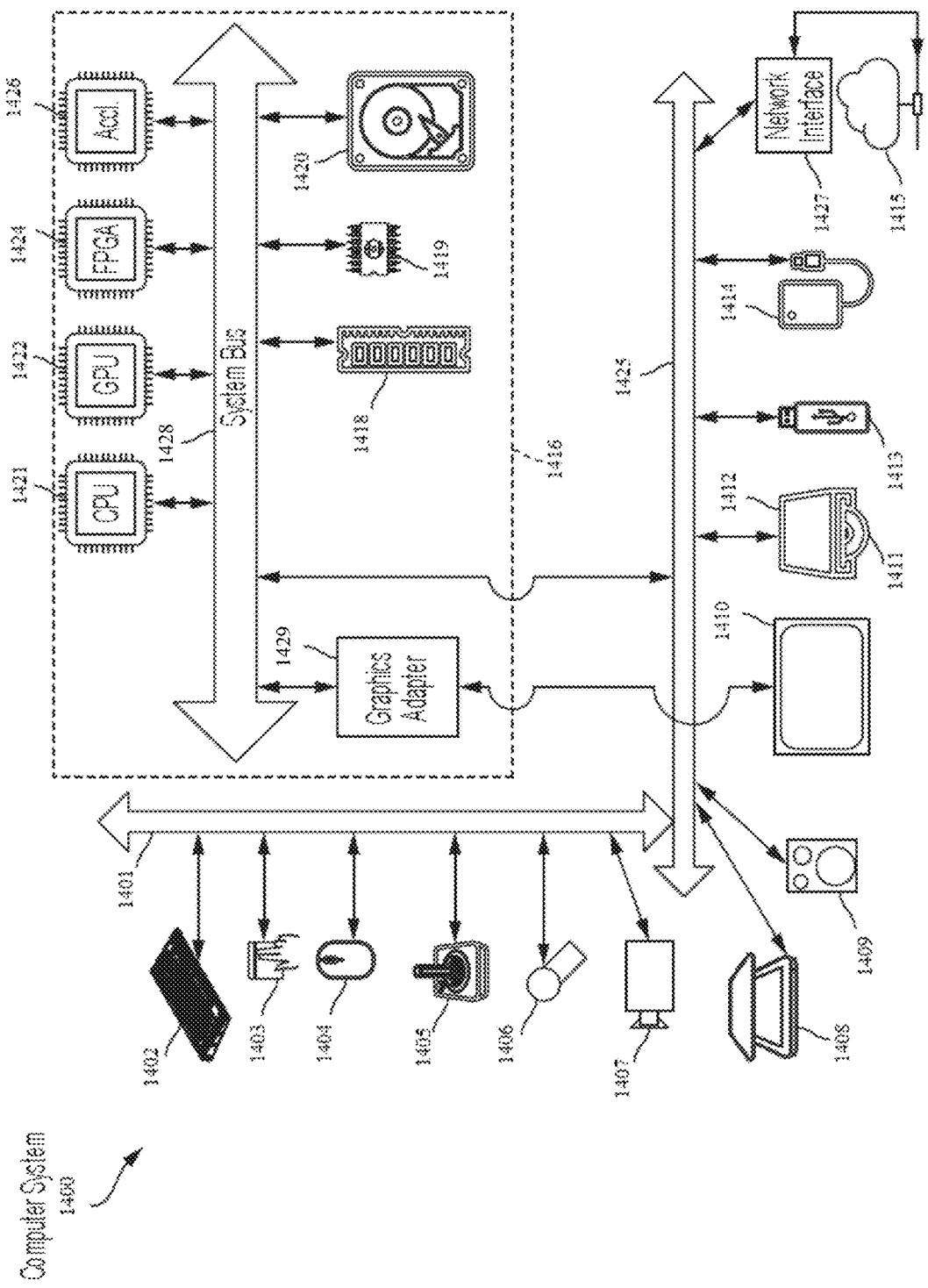
FIG. 14 is a schematic illustration of a diagram in accordance with embodiments.

The components shown in FIG. 14 for computer system 1400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1402, mouse 1404, trackpad 1403, touch screen 1410, joystick 1405, microphone 1406, scanner 1408, camera 1407.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, or joystick 1405, but there can also be tactile feedback devices that do not serve as input devices), audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter 1429 may be provided for interface to various input devices.

Computer system 1400 can also include human accessible storage devices and their associated media such as optical media including CD/DVD ROM/RW 1412 with CD/DVD or the like media 1411, thumb-drive 1413, removable hard drive or solid state drive 1414, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 can also include interface to one or more communication networks 1415. Networks 1415 can for example be wireless, wireline, optical. Networks 1415 can further be local, wide-area, metropolitan, vehicular and industrial, real-time, delay-tolerant, and so on. Examples of networks 1415 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1415 commonly require external network interface adapters 1427 that attached to certain general-purpose data ports or peripheral buses 1425 (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks, computer system 1400 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks 1415 and network interfaces 1427 as described above.

Aforementioned human interface devices, human-accessible storage devices, and network interfaces 1427 can be attached to a core 1416 of the computer system 1400.

The core 1412 can include one or more Central Processing Units (CPU) 1412, Graphics Processing Units (GPU) 1422, specialized programmable processing units in the form of Field Programmable Gate Areas (FPGA) 1424, hardware accelerators 1426 for certain tasks, and so forth. These devices, along with Read-only memory (ROM) 1419, Random-access memory 1418, internal mass storage such as internal non-user accessible hard drives, SSDs, and the like 447, may be connected through a system bus 1428. In some computer systems, the system bus 1426 can be accessible in the form of one or more physical plugs to enable extensions by additional CPUs, GPU, and the like. The peripheral devices can be attached either directly to the core's system bus 1428, or through a peripheral bus 1401. Architectures for a peripheral bus include PCI, USB, and the like.

CPUs 1421, GPUs 1422, FPGAs 1424, and accelerators 1426 can execute certain instructions that, in combination, can make up the aforementioned computer code. That computer code can be stored in ROM 1419 or RAM 1418. Transitional data can also be stored in RAM 1418, whereas permanent data can be stored for example, in the internal mass storage 1420. Fast storage and retrieve to any of the memory devices can be enabled through the use of cache memory, that can be closely associated with one or more CPU 1421, GPU 1422, mass storage 1420, ROM 1419, RAM 1418, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1400, and specifically the core 1416 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1416 that are of non-transitory nature, such as core-internal mass storage 1420 or ROM 1419. The software implementing various embodiments of the present disclosure can be stored in such devices and executed by core 1416. A computer-readable medium can include one or more memory devices or chips, according to particular needs. The software can cause the core 1416 and specifically the processors therein (including CPU, GPU, FPGA, and the like) to execute particular processes or particular parts of particular processes described herein, including defining data structures stored in RAM 1418 and modifying such data structures according to the processes defined by the software. In addition or as an alternative, the computer system can provide functionality as a result of logic hardwired or otherwise embodied in a circuit (for example: accelerator 1426), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, the method performed by at least one processor and comprising:
    selecting, based on whether an intra mode uses different initial weighting factors of position dependent intra prediction combination (PDPC) than PDPC, a set of weightings in an intra-inter mode; and
    applying PDPC to modify at least one of an inter prediction sample and a reconstructed sample of an inter coded coding unit (CU).
2. The method according to claim 1,
    wherein applying PDPC comprises modifying only a luma component of the inter coded CU.
3. The method according to claim 1, further comprising:
    signaling an interPDPCFlag in response to determining that a coding block (CB) is coded by a Merge mode.
4. The method according to claim 1, further comprising:
    applying PDPC to reconstructed samples before applying any of in-loop deblocking filters comprising deblocking, sample adaptive offset (SAO), and adaptive loop filter (ALF).
5. The method according to claim 1, further comprising:
    assigning a default intra prediction mode to a current coding block (CB), and
    applying the default intra prediction mode to CBs, following the current CB, for at least intra mode coding and most probable mode (MPM) derivation.
6. The method according to claim 1, further comprising:
    applying sets of PDPC filters to at least one of inter prediction samples, other than the inter prediction sample, and reconstructed samples of inter coded CUs other than the reconstructed sample of the inter coded CU,
    wherein each of the PDPC filters are defined for respective ones of a plurality of block sizes.
7. The method according to claim 6, further comprising:
    signaling at least one interPDPCFlag indicating whether to applying PDPC;
    determining whether the interPDPCFlag is set equal to true;
    in response to determining that the interPDPCFlag is set equal to a first value, signaling a second flag indicating at least one of the PDPC filters to be applied, after inter prediction, to the at least one of inter prediction samples and reconstructed samples of inter coded CUs; and
    in response to determining that the interPDPCFlag is set equal to a second value, determining to exclude PDPC from the at least one of inter prediction samples and reconstructed samples of inter coded CUs.
8. The method according to claim 1, further comprising:
    signaling whether the weighting are equal to each other; and
    weighting, in response to determining that the signaling indicates that the weightings are unequal, an inter-prediction in PDPC filtering depending on whether neighboring blocks are any of intra coded, inter coded, and intra-inter coded.
9. The method according to claim 1,
    wherein intra prediction is absent from the intra-inter mode.
10. The method according to claim 9,
    wherein applying PDPC directly on top of inter-prediction comprises applying $$\text{pred}(x,y)=(w\_\text{intra}*wL \times R-1,y+w\_\text{intra}*wT \times Rx,-1$$
    $$w\_\text{intra}*wTL \times R-1,-1+(N-w\_\text{intra}*wL-$$
    $$w\_\text{intra}*wT+w\_\text{intra}*wTL) \times \text{InterPred}(x,y)+$$
    $$N/2)>>\log 2(N)$$

wherein InterPred indicates an input inter prediction, w_intra is selected from a set of predefined values depending on whether the neighboring blocks are at least one of intra coded, inter coded, and intra-inter coded, and
    wherein N indicates one of 8, 16, 32, 64, 128, and 256.
11. An apparatus comprising:
    at least one memory configured to store computer program code;
    at least one hardware processor configured to access the computer program code and operate as instructed by the computer program code, the computer program code including:
    selecting code configured to cause the at least one processor to select, based on whether an intra mode uses different initial weighting factors of position dependent intra prediction combination (PDPC) than PDPC, a set of weightings in an intra-inter mode; and
    applying code configured to cause the at least one processor to apply PDPC to modify at least one of an inter prediction sample and a reconstructed sample of an inter coded coding unit (CU).

12. The apparatus according to claim 11, wherein the applying code is further configured to cause the at least one processor to modify only a luma component of the inter coded CU in order to apply PDPC.

13. The apparatus according to claim 11, wherein the signaling code is further configured to cause the at least one processor to signal an interPDPCFlag in response to determining that a coding block (CB) is coded by a Merge mode.

14. The apparatus according to claim 11, wherein the applying code is further configured to cause the at least one processor to apply PDPC to reconstructed samples before applying any of in-loop deblocking filters comprising deblocking, sample adaptive offset (SAO), and adaptive loop filter (ALF).

15. The apparatus according to claim 11, further comprising:
assigning code configured to cause the at least one processor to assign a default intra prediction mode to a current coding block (CB),
wherein the applying code is further configured to cause the at least one processor to apply the default intra prediction mode to CBs, following the current CB, for at least intra mode coding and most probable mode (MPM) derivation.

16. The apparatus according to claim 11, wherein the applying code is further configured to cause the at least one processor to apply sets of PDPC filters to at least one of inter prediction samples, other than the inter prediction sample, and reconstructed samples of inter coded CUs other than the reconstructed sample of the inter coded CU, and
wherein each of the PDPC filters are defined for respective ones of a plurality of block sizes.

17. The apparatus according to claim 16, wherein the signaling code is further configured to cause the at least one processor to:
signal at least one interPDPCFlag indicating whether to applying PDPC;
determine whether the interPDPCFlag is set equal to true;
in response to determining that the interPDPCFlag is set equal to a first value, signal a second flag indicating at least one of the PDPC filters to be applied, after inter prediction, to the at least one of inter prediction samples and reconstructed samples of inter coded CUs; and
in response to determining that the interPDPCFlag is set equal to a second value, determine to exclude PDPC from the at least one of inter prediction samples and reconstructed samples of inter coded CUs.

18. The apparatus according to claim 11, further comprising:
signaling code configured to cause the at least one processor to signal whether the weightings are equal to each other; and
weighting code configured to cause the at least one processor to weight, in response to determining that the weightings are unequal, an inter-prediction in PDPC filtering depending on whether neighboring blocks are any of intra coded, inter coded, and intra-inter coded.

19. The apparatus according to claim 11, wherein intra prediction is absent from the intra-inter mode,
wherein applying PDPC directly on top of inter-prediction comprises applying $$\mathrm{pred}(x,y) = (w\_\mathrm{intra}*wL \times R_{-1,y} + w\_\mathrm{intra}*wT \times R_{x,-1} - w\_\mathrm{intra}*wTL \times R_{-1,-1} + (N - w\_\mathrm{intra}*wL - w\_\mathrm{intra}*wT + w\_\mathrm{intra}*wTL) \times \mathrm{InterPred}(x,y) + N/2) \gg \log 2(N)$$

wherein InterPred indicates an input inter prediction, w_intra is selected from a set of predefined values depending on whether the neighboring blocks are at least one of intra coded, inter coded, and intra-inter coded, and
wherein N indicates one of 8, 16, 32, 64, 128, and 256.

20. A non-transitory computer readable medium storing a program causing a computer to execute a process, the process comprising:
selecting, based on whether an intra mode uses different initial weighting factors of position dependent intra prediction combination (PDPC) than PDPC, a set of weightings in an intra-inter mode; and
applying PDPC to modify at least one of an inter prediction sample and a reconstructed sample of an inter coded coding unit (CU).

* * * * *